(12) United States Patent
Wasmund

(10) Patent No.: US 8,699,685 B2
(45) Date of Patent: Apr. 15, 2014

(54) METHOD FOR MANAGING COMMUNICATION EVENTS IN A COMMUNICATION SYSTEM

(75) Inventor: Michael Wasmund, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 1201 days.

(21) Appl. No.: 12/388,375

(22) Filed: Feb. 18, 2009

(65) Prior Publication Data
US 2009/0207995 A1 Aug. 20, 2009

(30) Foreign Application Priority Data
Feb. 20, 2008 (EP) ..................................... 08151679

(51) Int. Cl.
*H04M 3/42* (2006.01)
(52) U.S. Cl.
USPC ............ 379/201.01; 379/201.02; 379/208.01; 379/211.01
(58) Field of Classification Search
USPC ............. 379/211.02, 201.01, 207.02, 208.01, 379/211.01, 212.01
See application file for complete search history.

(56) References Cited

U.S. PATENT DOCUMENTS

| | | | | |
|---|---|---|---|---|
| 4,604,710 A | * | 8/1986 | Amezcua et al. | ................ 703/27 |
| 6,067,357 A | * | 5/2000 | Kishinsky et al. | ....... 379/265.02 |
| 7,103,167 B2 | * | 9/2006 | Brahm et al. | ............ 379/211.02 |
| 2007/0248011 A1 | * | 10/2007 | Ohno et al. | .................... 370/230 |
| 2007/0260920 A1 | * | 11/2007 | Turner et al. | .................... 714/17 |
| 2009/0086681 A1 | * | 4/2009 | Chaturvedi et al. | ........... 370/332 |

* cited by examiner

*Primary Examiner* — Khai N Nguyen
(74) *Attorney, Agent, or Firm* — Steven M. Greenberg, Esq.; CRGO Law

(57) ABSTRACT

The present invention relates to managing communication events in a Communication System at least comprising
- a first communication device (1), associated with a first user named Caller;
- a second communication device (2), associated with a second user named Callee;
- a central component, named Gatekeeper (3), being connected to said first and second communication devices (1, 2) to mediate communication connections between the Caller and the Callee, wherein said Gatekeeper (3) is also connected to said users' workstations (1, 2).

A method is provided for reducing or preventing a negative impact of communication-based interruptions on a user's work.

The invention relates to the case that a communication connection is established and, therefor, proposes to initiate state-saving actions on the workstation (1, 2) of at least one user involved in said communication.

10 Claims, 2 Drawing Sheets

METHOD FOR MANAGING COMMUNICATION EVENTS IN A COMMUNICATION SYSTEM

CROSS-REFERENCE TO RELATED APPLICATIONS

This application claims priority under 35 U.S.C. §119(a) to European Patent Application Serial Number EP08151679.1, filed Feb. 20, 2008, entitled "METHOD FOR MANAGING COMMUNICATION EVENTS IN A COMMUNICATION SYSTEM", the entirety of which is incorporated herein by reference.

BACKGROUND OF THE INVENTION

1. Field of the Invention

In general, the present invention relates to the field of communication events in a communication system providing a variety of communication media for each user, such as video conferences, telephony, instant messaging and e-mail. Therefore, the communication system comprises a first communication device, associated with a user named Caller; a second communication device, associated with a user named Callee; and a central component, named Gatekeeper, which is connected to said first and second communication devices to mediate communication connections between Caller and Callee. Besides, said Gatekeeper is connected to or embedded in said users' workstations. More particularly, the present invention relates to the management of communications in such a communication system to reduce the impact of interruption to a user's creative work.

2. Description of the Related Art

Productivity of people can be severely degraded by unwanted interruptions. On the other hand there is the need for people to be available for important matters using various communication channels. The conflict between "uninterrupted creative work" and "ubiquitous availability" needs to be balanced.

This problem is well-known in the art and also automatic means for managing communication requests encompassing a multitude of available communication vehicles and considering the Callers requirements, the Callee's state of business and the communication medium chosen by the Caller.

Such a communications management system is described in US 2004/0255015 A1. It comprises at least one communication source representing the Caller, at least one communication recipient representing the Callee, and a communication manager as central component between communication sources and communication recipients. This communication manager is a rule-based engine having access to a general data store where the general rules and related parameters are stored and an exception data store where the exceptions to the general rules are stored. According to the US 2004/0255015 A1 the communication manager can be a network element linked to a telecommunication system and/or server. Alternately, the communication manager can be a client based application or series of applications operating within one or more computing devices. Both implementations provide a connection between the communication manager and the users' workstations.

The method for managing communication requests proposed in the US 2004/0255015 A1 is based on associating each incoming communication attempt with a unique predetermined communication event having a predetermined event weight. Communication events can be established for each communication channel, such as a telephone channel, an e-mail channel or the like. Besides, each user can establish individual communication events based on specified communication sources or Caller, respectively. Thus, it is possible to rank the Callers and to evaluate the communication medium chosen by a specific Caller. Then, the event weight of an incoming communication request is compared to an event threshold to decide what kind of communication actions to take. The event thresholds as well as the corresponding communication actions are established in an initialisation stage. However, the system allows to temporarily adjust event weights and/or event thresholds to account for the Callee's individual timetable.

Altogether, the system described in US 2004/0255015 A1 is able to protect the sphere of people who need to work uninterrupted. It allows a user to specify to what extent he is available for what kind of communication and it provides automatic means to identify important communication to be put through to the user. By defining appropriate communication actions an automatic switching between different communication channels based on user preference may be implemented.

OBJECT OF THE INVENTION

Starting from this kind of automated communication management, object of the present invention is to provide means for reducing or preventing a negative impact of communication-based interruptions on a user's work.

BRIEF SUMMARY OF THE INVENTION

The foregoing object is achieved by a method as laid out in the independent claim 1. Further advantageous embodiments of the present invention are described in the subclaims and are taught in the following description.

According to the present invention the claimed method is characterized in that in case of establishing a communication connection state-saving actions are initiated on the workstation of at least one user involved in said communication.

Hence, the present invention relates to the case of interruption. For this case means are provided to support a user when returning to work on his workstation. This kind of work usually comprises the use of several applications running in parallel on the workstation, the access to databases, the use of the internet, etc. Very often, the communication with other users requires to invoke further programs or to access other databases via the workstation. If the interruption exceeds a certain time or involves too many actions on the workstation, it becomes difficult to retrieve the work status prior to the interruption and to continue the original work.

Therefore, the invention proposes to automatically initiate state-saving actions on the Callee's and/or Caller's workstation as soon as a communication connection is established which causes an interruption. This support can be offered as well to the Callee as to the Caller because both are affected by the interruption.

There are various possibilities to implement the invention and especially the state-saving actions depending on the kind of communication connection and the users' individual requirements.

In an advanced embodiment of the invention state-saving actions are only initiated in case of communication connections via selected communication media which imply a certain intrusion to the user's work, like instant messaging, or even require the user's immediate and total attention, as for example video conferences or telephone calls.

Another embodiment of the present invention takes into account that state-saving actions may be relatively extensive and thus should only be performed in case that the communication, i.e. the interruption, exceeds a preset duration.

The state-saving actions automatically initiated according to the invention may comprise several independent steps or procedures configured by the operator of the communication system or by an individual user of this communication system.

In a first implementation the automatically initiated state-saving actions comprise an automatic prompting of the user about the interruption reminding him about the possibility to perform further state-saving actions. These further state-saving actions may then be activated automatically or have to be activated by the user.

The automatically initiated state-saving actions may also comprise the execution of a "save all" or "autosave" action for predetermined applications. For resuming work after an interruption it is often very helpful to return to the last display on the screen prior to the interruption. Therefore, said automatically initiated state-saving actions may comprise the saving of a screen shot.

According to another preferred embodiment of the invention the user himself can configure state-saving actions to be performed automatically in case of interruption to optimally support the user's individual way of working and the user's individual requirements when working with his workstation.

Besides, it is also possible to use state-saving actions immanent to applications running on the user's workstation. In This case the automatically initiated state-saving actions according to the invention comprise invoking these application immanent state-saving actions.

BRIEF DESCRIPTION OF THE DRAWINGS

The novel features of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein

DETAILED DESCRIPTION OF THE INVENTION

Figure 1:
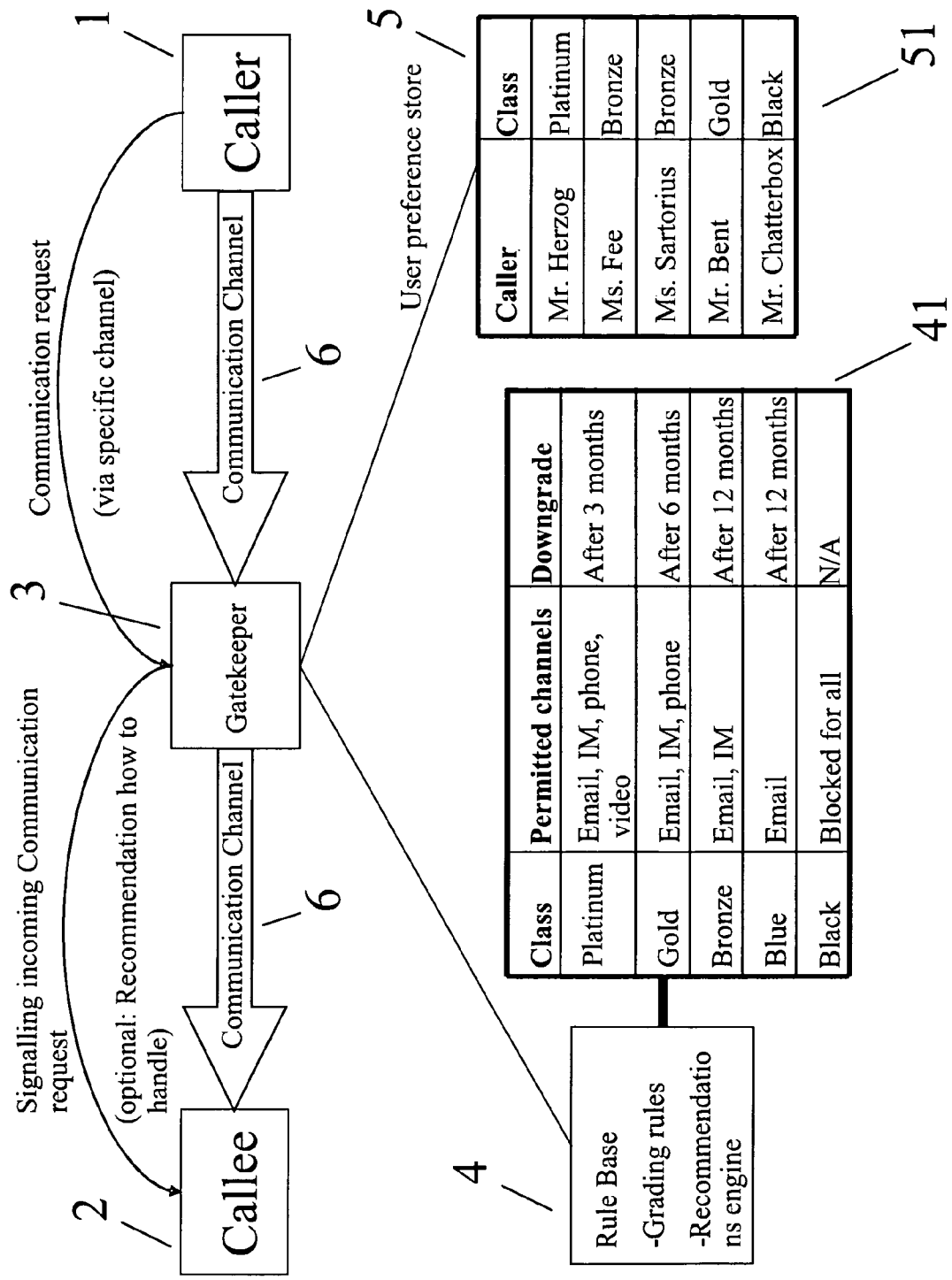
FIG. 1 shows a diagram illustrating the function of a Gatekeeper component within a communication system comprising a Caller and a Callee, when performing a method for managing communications according to the invention.

The communication system illustrated in the FIG. 1 comprises five essential components:

A first communication device 1, associated with a Caller. This first communication device 1 can be an e-mail client, an Instant Messaging (IM) client, a phone or a video conference frontend, etc. In the here described example the first communication device is linked to the Caller's workstation.

A second communication device 2, associated with a Callee. This second communication device 2 comprises the same technical features as the first communication device 1 and is linked to the Callee's workstation.

A central component, named Gatekeeper 3, which mediates between Caller and Callee. This Gatekeeper 3 is implemented in a communication server connected to all communication channels 6 between Caller and Callee.

A rule-based engine 4 connected to the Gatekeeper 3. This rule-based engine 4 provides rules for managing the communication between Caller and Callee.

A database, called user preference store 5, also connected to the Gatekeeper 3. This user preference store 5 houses a ranking list of the Callee's most frequent communication partners, which is a table 51 listing the communication partners together with the priority class they belong to. It may comprise further information as e.g. communication history about which channels have been used at what time.

It should be mentioned here that a communication system, as it is described above, usually comprises a plurality of users who may act both as Caller and as Callee. Accordingly, the user preference store 5 keeps a ranking list for each user.

If the Caller wants to establish communication to the Callee via a certain communication channel 6, like e.g. video conference, he sends a corresponding request to the Gatekeeper 3. Thereon, the Gatekeeper 3 accesses the user preference store 5 to check, whether the Caller is listed as frequent communication partner of the Callee, and if so, which priority class he belongs to. If the Gatekeeper 3 is able to determine a priority class for the Caller, the Gatekeeper 3 acesses the rule-based engine 4. There, a mapping 41 is stored indicating the communication media allowed for Callers with the priority class determined before. Only if the communication channel 6 chosen by the Callee, here video conference, is one of these allowed communication media, a communication connection is established.

In case that the Caller is not listed in table 51 or that the Caller is not allowed to use the chosen communication channel 6, the Callee is prompted that someone wants to establish communication with him although not belonging to the class of persons permitted. Thus, the Callee can decide whether to grant permission to communicate via the desired communication channel 6 on an exceptional basis or to deny the request. In the latter case a respective notification is sent to the Caller and optionally a message may be sent to the Caller to propose the use of a communication medium less intrusive.

The here described communication system and method for managing communications within this system are based on classifying communication partners into groups. Each group has specific permissions for communication channels ranging from e-mail to video conference, wherein it is supposed that the impact of interruption depends on the communication medium used. For example, the impact is minimum in case of e-mail and maximum in case of a video conference.

Once the classification system is setup, communication partners need to be classified, because only selected communication partners should be permitted to use intrusive means of communication such as video conferences or phone calls. Each user can configure his own "firewall" by creating an individual ranking list for his frequent communication partners and storing this ranking list in the user preference store. Therefore, the system allows to classify a new Caller and to store this assignment in the Callee's individual ranking list at each communication session. For users who do not want to explicitly configure these permissions, the system provides a default set, e.g. depending on the users' position in a professional hierarchy.

Besides, the system offers the possibility to revise the classification of communication partners, either manually in course of a communication session or automatically, for example in case that the communication frequency with a certain Caller has changed. Thus, a Caller can be downgraded automatically after not having used a specific communication medium a preset time period.

In an advanced embodiment, the Gatekeeper 3 is able to take into account the Callee's state of business. Then, a communication connection is only established if the Callee is not classified as "busy". A Callee identified as busy may be prompted whether the incoming communication request should be admitted, and if not, the Caller may be informed about the Callee to be busy at the moment.

The Callee's state of business can be determined automatically using so called "indicators of business", as for example the number of open communication channels associated with the Callee. Besides, the system may allow the Callee to actively inform the Gatekeeper about his state of business, i.e. to set a "not available"-flag, and to specify the duration of this state of business. The Callee may also specify, whether an unsuccessful Caller shall be informed about changes in the Callee's business status, eventually depending on the Caller's classification.

According to the invention state-saving actions are initiated on the workstation of the Callee and/or the Caller in case of establishing a communication connection. Reasonably, some state saving actions are only initiated in case of using more intrusive communication media, like video conferences, telephone or instant messaging. This will be discussed in the following exemplarily for instant messaging (IM):

Although, the state-saving actions are initiated by the Gatekeeper 3, when establishing the IM-connection, the performance of said state-saving actions may be delayed. The stimulus may be when a new IM-message appears or when the user starts typing a message. In another embodiment of the invention, said state saving actions are only performed in case that the IM-communication exceeds a preset duration. This allows to suppress such actions in case of very brief IM-sessions.

The extent of state-saving actions automatically initiated by the Gatekeeper 3 is configurable and will usually depend on the kind of communication connection and the user's individual requirements.

In some cases the user may prefer to be prompted automatically to be aware about state-saving actions being performed or to decide whether such an action should be performed and eventually activate specific state-saving actions himself.

The two most straightforward state-saving actions are to execute a "save all" or "autosave" action and to produce and save a screen shot. Both alternatives provide a checkpoint where the user can return to in case of having lost the own course of action prior to the interruption.

Users may register certain actions with the IM client to be performed by each application prior to an accepted interruption, i.e. prior to starting an IM conversation. Thereby, the user can configure individual actions for selected applications running on the user's workstation or the user can invoke application immanent state saving actions. Thus, it is possible to set a checkpoint within those applications registered with the IM client. Such a checkpoint could then be used to "undo" all actions of the application which happened after starting the IM conversation.

Figure 2:
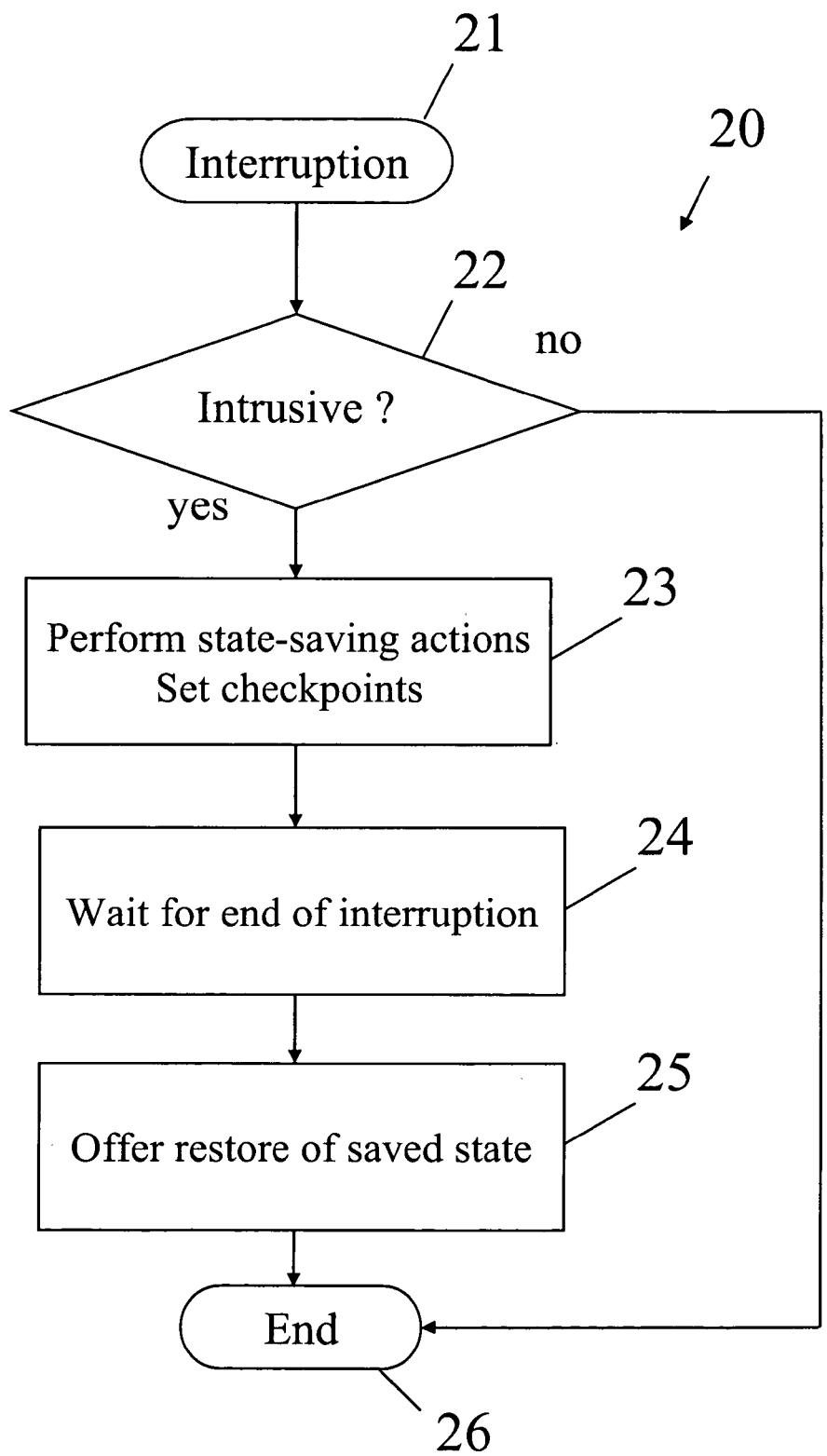
FIG. 2 shows a flowchart illustrating the claimed method for managing communication events.

The process 20 depicted in FIG. 2 begins with step 21, when the Callee accepts to be interrupted by an incoming communication event, such as a phone call. In step 22 the system determines the level of intrusion involved with said communication event. This may be done on basis of heuristics or a configured set of thresholds. Only in case that the communication event is classified as to be intrusive, state saving actions, as described above, are performed in step 23. Besides, the system monitors the course of the communication in step 24. Once the communication is terminated, the system offers the Callee and/or the Caller to return all or a chosen subset of applications to the state prior to the interruption. This is done in step 25. Then, process 20 is completed in step 26. In case that the communication event has been classified as non intrusive in step 22, process 20 flows directly to ending step 26.

The invention claimed is:

1. A method for managing communication events in a communication system at least comprising
   a first communication device (1), associated with a first user, coupled to a first workstation;
   a second communication device (2), associated with a second user, coupled to a second workstation;
   a central component (3), being connected to said first and second communication devices (1, 2) to mediate communication connections between the first user and the second user, wherein said central component (3) is also connected to both the first workstation and the second workstation;
   said method comprising:
   establishing a communication connection between the first workstation and the second workstation upon determining that the first user is a communication partner of the second user, the priority class of the first user, and also that a communication media the first user selected is permitted based upon the priority class of the first user; and,
   in response to establishing the communication connection between the first workstation and the second workstation, initiating a state-saving action for at least one of the first workstation of the first user and the second workstation of the second user.

2. The method according to claim 1, wherein the state saving action is only initiated in case of the communication connection established via communication media (6), selected from the group consisting of telephone calls, video conferences and instant messaging.

3. The method according to claim 1, wherein the state saving action is only performed in case that the communication connection exceeds a preset duration.

4. The method according to claim 1, further comprising providing a prompt requesting permission to perform the state saving action before performing the state saving action.

5. The method according to claim 1, wherein said state saving action comprises executing one of a "save all" and an "autosave" action.

6. The method according to claim 1, wherein said state saving action comprises saving a screen shot of at least one of the first workstation of the first user and the second workstation of the second user subject to the state saving action.

7. The method according to claim 1, wherein said state saving action comprises user configured actions for individual applications running on at least one of the first workstation of the first user and the second workstation of the second subject to the state saving action.

8. The method according to claim 1, wherein said state saving action comprises invoking an imminent application state saving action.

9. The method according to claim 1, wherein the communication media is selected from the group consisting of a telephone call, a video conference, and an instant message.

10. A computer program product stored on a non-transitory computer usable storage medium, storing computer readable program means for causing a computer to perform a method comprising
    establishing a communication connection between a first workstation and a second workstation over a network upon determining that a first user coupled to the first workstation is a communication partner of the second user coupled to the second workstation, the priority class of the first user, and also that a communication media the first user selected is permitted based upon the priority class of the first user; and, in response to establishing the communication connection between the first workstation and the second workstation, initiating a state-saving action for a workstation of at least one of the first user and the second user.

\* \* \* \* \*